Oct. 27, 1942.     F. T. BONEBRAKE     2,300,335
PITMAN
Filed April 25, 1941     2 Sheets-Sheet 1
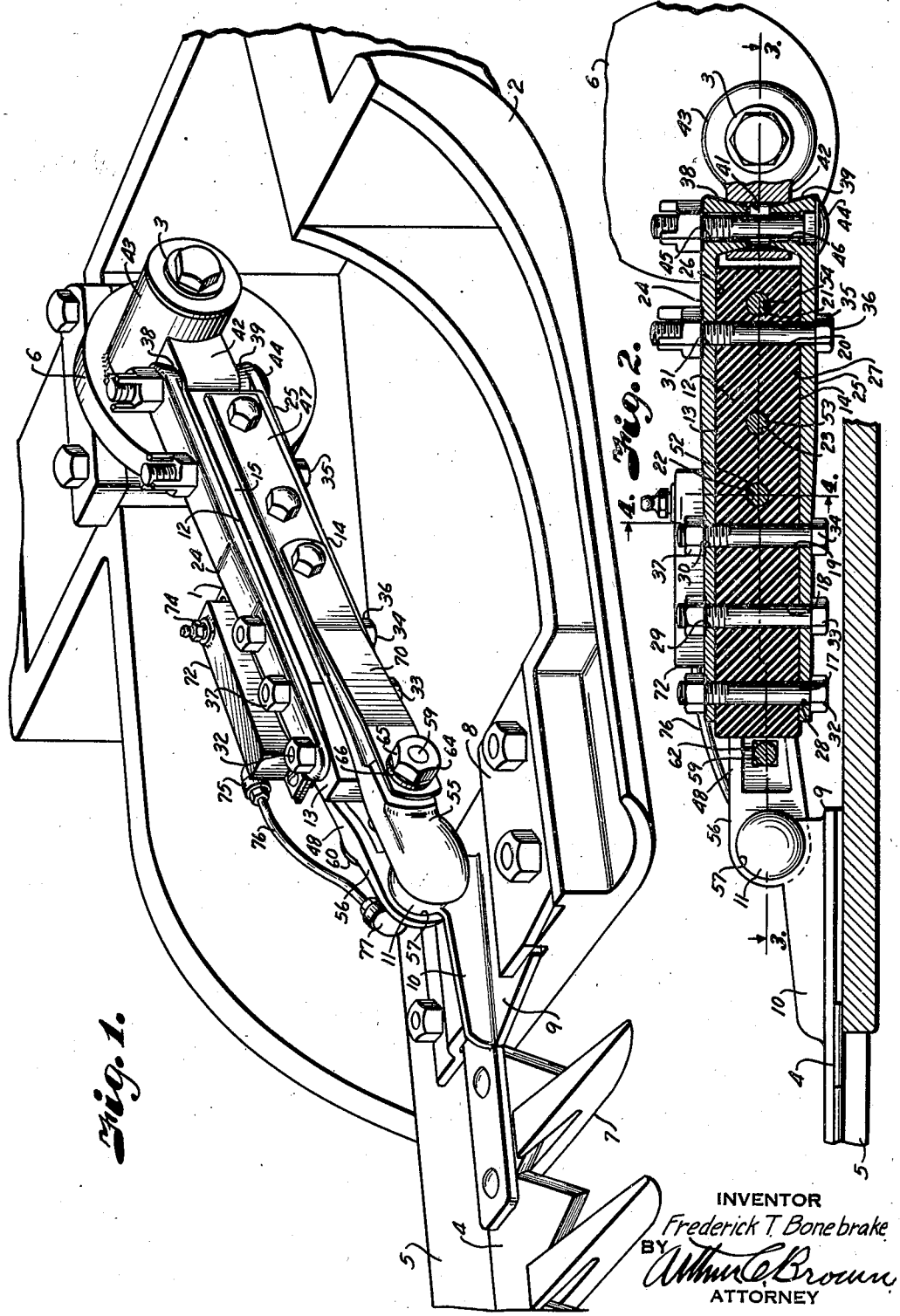
INVENTOR
*Frederick T. Bonebrake*
BY
*Arthur C. Brown*
ATTORNEY

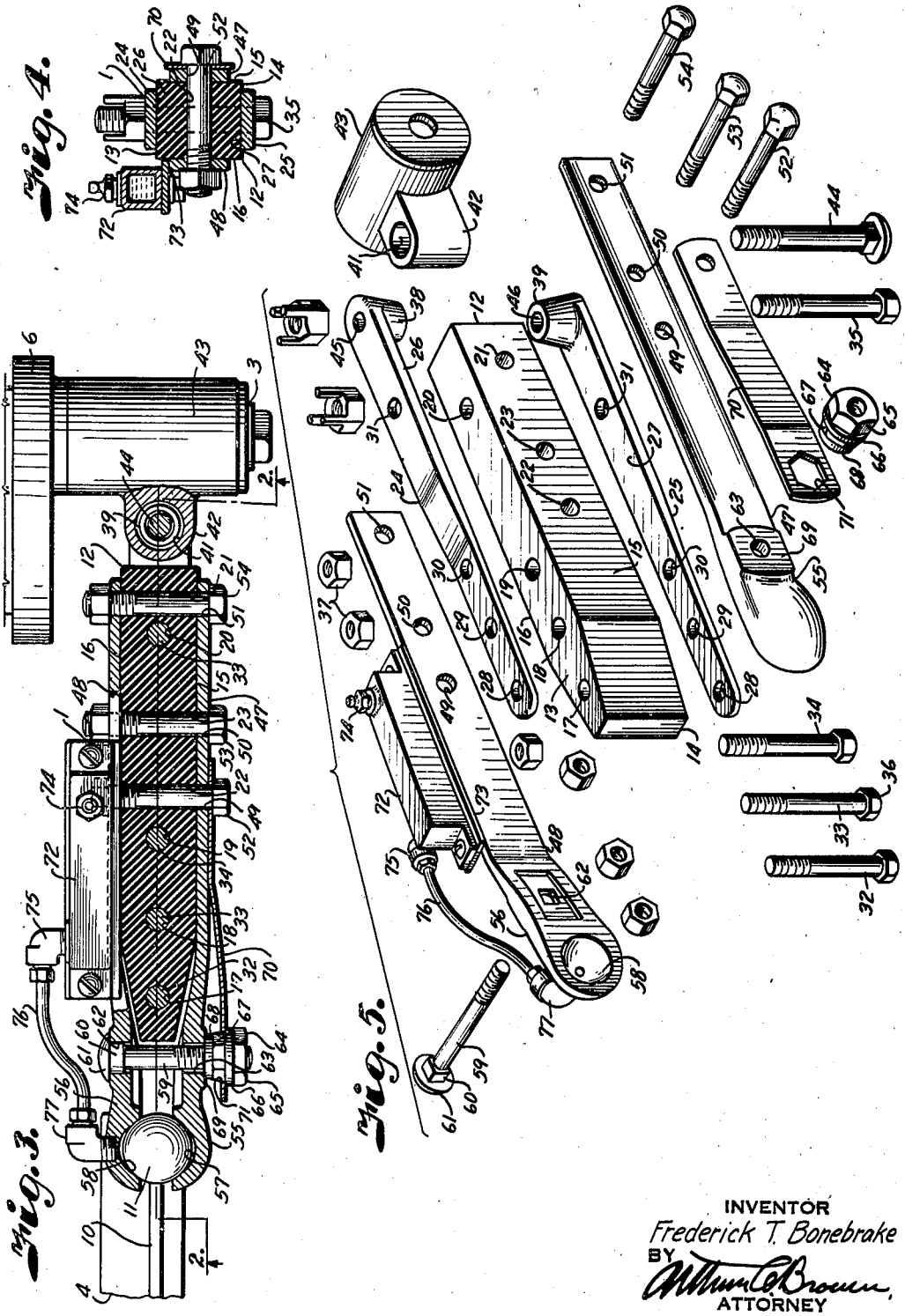

Patented Oct. 27, 1942

2,300,335

UNITED STATES PATENT OFFICE 2,300,335

PITMAN

Frederick T. Bonebrake, Topeka, Kans., assignor of one-fourth to Charles H. Martin, and one-fourth to Fred P. Martin, both of Topeka, Kans.

Application April 25, 1941, Serial No. 390,329

5 Claims. (Cl. 74—581)

This invention relates to a pitman for use in transforming rotary motion to reciprocatory motion, for example the pitman which connects the crank-shaft of a mowing machine with the sickle or cutter bar.

The principal object of the invention is to provide a pitman construction having sufficient resiliency to absorb and dampen the destructive impacts incidental to reciprocatory motion and which is sufficiently rigid to eliminate back-lash and lost motion between the connected parts.

Other objects of the invention are to provide a pitman constructed to reduce vibration and provide quiet operation; to provide a pitman structure which reduces wear upon the cutter and sickle bar guides, wrist pin, ball and socket joint, and other moving parts connected therewith; and to provide a pitman of this character having means for automatically supplying lubricant to the ball and socket joint between the pitman and sickle bar.

In accomplishing these and other objects of the invention, I have provided improved structure, the preferred form of which is illustrated in the accompanying drawings, wherein:

Fig. 1 is a perspective view of the sickle shoe of a mowing machine equipped with a pitman embodying the features of the present invention.

Fig. 2 is a longitudinal vertical section through the pitman on the line 2—2 of Fig. 3.

Fig. 3 is a horizontal section on the line 3—3 of Fig. 2.

Fig. 4 is a cross-section on the line 4—4 of Fig. 2.

Fig. 5 is a detail perspective view of the parts of the pitman shown in disassembled spaced relation to better illustrate the construction thereof.

Referring more in detail to the drawings:

1 designates a pitman constructed in accordance with the present invention and particularly adapted for use in a mowing machine indicated by the sickle shoe 2 for connecting the wrist pin 3 of the sickle driving crank with the cutter bar 4 of the sickle 5. The wrist pin 3 is carried eccentrically on a disk 6 fixed to the driving shaft extending in the longitudinal direction of the machine whereby the wrist pin is planetated in the transverse direction and at a point above the horizontal plane of the cutter bar.

The cutter bar is reciprocably supported on the sickle guard bar 7 and retained by guide plates 8 extending over the head plate 9 of the cutter bar. The plate 9 includes a bracket portion 10 having a ball 11 which is connected with the socket members of the pitman. The parts referred to, with the exception of the pitman, are conventional mowing machine design. In structures of this character, the ball and socket joint must be free acting and have a relatively loose fit, consequently the starting and stopping of the sickle with directional change of the rod results in a hammering and peening action between the ball and ball socket. The pitman, therefore, is constructed to cushion the destructive forces.

The pitman includes a substantially rectangular body 12 formed of rubber or other resilient material of sufficient length to extend the major distance between the wrist pin 3 and ball 11 of the cutter bar. The resilient body 12 has substantially flat parallel faces 13—14 and 15—16 and the ends nearest the cutter bar converge inwardly from the side faces 15 and 16 toward the center of the ball 11. The wedge-shaped end is provided with openings 17, 18 and 19 extending vertically therethrough from the face side 13 to the side 14. The opposite end of the body 12 has a similar opening 20 and a transverse opening 21 staggered with respect thereto, the opening 21 extending between the side faces 15 and 16. Also extending transversely through the pitman body, and intermediate the openings 19 and 20, are transverse openings 22 and 23.

24 and 25 designate strap-like bars having flat faces 26 and 27 engaged with the faces 13 and 14 of the pitman body, the straps being of slightly less width than the pitman body, as shown in Fig. 4. The straps 24 and 25 have openings 28, 29, 30 and 31 registering with the openings 17, 18, 19 and 20 to pass fastening devices 32, 33, 34 and 35 therethrough to retain the resilient body of the pitman in clamped engagement between the straps, the fastening devices being shown as bolts having heads 36 engaging the under face of the strap 25 and having threaded shanks projecting through the upper strap 24 for mounting nuts 37. The straps project beyond the end of the pitman body nearest the wrist pin and terminate in facing, truncated bosses 38 and 39 adapted to seat in an opening 40 in an ear 42 extending laterally from a wrist pin sleeve 43, as best shown in Fig. 5, the sleeve 43 being mounted on the wrist pin and retained by a cap-screw. The bosses 38 and 39 are retained in the ends of the opening 40 by a bolt 44 extending through openings 45 and 46 in the ends of the straps and through the opening 40 so as to provide a joint to take care of any misalignment which may occur between the wrist pin and the cutter bar.

The pitman also includes similar straps 47 and 48 engaging the side faces 15 and 16 and have openings 49, 50 and 51 registering with the openings 22, 23 and 21 to pass fastening devices 52, 53 and 54 whereby the straps are clamped against the resilient body in the same manner as the straps previously described. The straps have converging ends 55 and 56 extending alongside the wedged end of the pitman body and which terminate in sockets 57 and 58 to receive and embrace the sides of the ball connection 11 with the cutter bar. With this arrangement the straps 47 and 48 are attached to the resilient body only at the end nearest the wrist pin and the ends 55 and 56 are substantially free so as to maintain the desired tension on the ball 11. This is effected by a draw-bolt 59 having a squared shoulder 60 at the head 61 thereof engaged in a squared opening 62 of the strap 48 and having its threaded shank extending through a registering opening 63 in the other strap for mounting a nut 64. The nut 64 has a polygonal-shaped head 65, a flange 66, and a polygonal-shaped shoulder 67 of a smaller size than the flange and which terminates in a cylindrical portion 68 adapted to abut aginst a pad 69 on the strap 47 when the nut is tightened. A flat type locking spring 70 is attached to the outer face of the strap 47 by the bolt 52, and has a free end provided with a polygonal-shaped opening 71 to engage the polygonal-shaped shoulder portion 67 of the nut 64 and prevent rotation thereof after adjustment. To readjust the nut, the spring 70 is pressed against the strap 48 so that the polygonal-shaped opening 71 thereof passes over the cylindrical portion 68 of the nut 64, whereupon the nut may be adjusted on the draw-bolt 59. After adjustment, pressure is released on the spring 70 and the spring returns to its original position against the flange 66 with the polygonal-shaped shoulder 67 of the nut 64 engaging in the polygonal opening 71 of the spring 70.

In order to lubricate the connection between the sockets 57—58 and the ball 11, an elongated reservoir 72 is attached to the strap 48 by welding or the like, as indicated at 73 in Fig. 4. The reservoir is substantially elongated and has a pressure fitting 74 at the top thereof whereby lubricant may be admitted to the chamber of the reservoir. The forward end of the reservoir has an outlet fitting 75 connected by a pipe 76 with a fitting 77 having outlet into the socket 57.

In operation, reciprocation of the pitman throws the lubricant toward the outlet end of the chamber and discharges it through the pipe 76 to the ball and socket joint, thereby providing a substantially constant flow of lubricant between the ball and socket to wash dust and abrasive materials from therebetween, giving lengthened life to these parts. When the crank is rotated the wrist pin end of the pitman planetates about the axis of the crank to effect reciprocation of the cutter bar through the pitman connection. It is well known that where cranks are located above the connection with the cutter bar, operation of the crank produces up and down thrusts on the cutter bar with respect to the guide plates 8, produces vibration, a noisily operating mechanism, and results in rapid wear of the parts, but with the pitman constructed and assembled as described, there is no direct metallic or rigid connection between the wrist pin end of the pitman and the opposite end, the only connection being made through the resilient body of the pitman. The resilient body is, therefore, free to flex sufficiently to dampen the tendency of the pitman to pound the cutter bar in its guides, as well as to cushion horizontal thrusts effected by starting and stopping the sickle at the ends of the stroke, and reduce the hammering and peening action between the sickle ball 11 and pitman sockets 57 and 58. The resilient pitman construction also reduces thrust on the crank pin bearing. This also reduces wear between the knives of the cutter bar and the sickle guides, and relieves strain on the operating mechanism in case the sickle bar should strike an obstruction difficult to cut.

From the foregoing it is obvious that I have provided a pitman which operates more satisfactorily than the conventional type of pitman and materially reduces noise and wear of the working parts.

What I claim and desire to secure by Letters Patent is:

1. A pitman including, an elongated body member formed of rubber, straps embracing opposite sides of said member, and fastening devices extending through said straps and through the body member for securing the straps in embracing relation with said body member.

2. A pitman including, an elongated body member formed of rubber, straps embracing opposite sides of said member, fastening devices extending through said straps and through the body member for securing the straps in embracing relation with said body member, selected straps projecting from ends of the body member, means connecting the other ends of the straps to the body member opposite the projecting ends, and means connecting the projecting ends at the respective ends of the body member with an actuating and actuated means respectively.

3. A pitman including an elongated body member formed of resilient material such as rubber, a pair of straps extending substantially coextensive with the body member on opposite sides thereof, means connecting the pair of straps with an actuating means at one end of the body member, fastening devices extending through the straps and body member at the opposite end of said body member, a pair of straps substantially coextensive with the other sides of the body member, means connecting the last named straps with a means to be actuated at the end of the body member opposite said connection means for the other pair of straps, and fastening devices extending through the last named straps and body member at the end of the body member opposite the first named fastening devices.

4. A pitman including an elongated body member formed of resilient material such as rubber, a pair of straps extending substantially coextensive with the body member on two opposite sides thereof, means connecting the pair of straps with an actuating means at one end of the body member, fastening devices extending through the straps and body member at the opposite end of said body member, a pair of straps substantially coextensive with the other sides of the body member, means connecting the last named straps with a means to be actuated at the end of the body member opposite said actuating connection of the other straps, fastening devices extending through the last named straps and body member at the end of the body member opposite the first named fastening devices, and separate fastening devices connecting the straps adjacent the connection means for the actuating and actuated means.

5. A pitman including an elongated body member formed of resilient material such as rubber, a pair of straps extending substantially coextensive with the body member on two opposite sides thereof, means connecting the pair of straps with an actuating means at one end of the body member, fastening devices extending through the straps and body member at the opposite end of the body member, a pair of straps substantially coextensive with the other sides of the body member, means connecting the last named straps with a means to be actuated at the end of the body member opposite said actuating connection of the other straps, fastening devices extending through the last named straps and body member at the end of the body member opposite the first named fastening devices, and separate fastening devices connecting the straps adjacent the connection means for the actuating and actuated means, the fastening device adjacent the connection for the actuating means extending through the body member.

FREDERICK T. BONEBRAKE.